(12) United States Patent
Lund

(10) Patent No.: US 8,208,480 B2
(45) Date of Patent: Jun. 26, 2012

(54) STACKABLE NETWORK PROCESSING DEVICE WITH TOP MOUNTED IO PORT CONNECTORS

(75) Inventor: Mats Lund, Novato, CA (US)

(73) Assignee: Force10 Networks, Inc., San Jose, CA (US)

( * ) Notice: Subject to any disclaimer, the term of this patent is extended or adjusted under 35 U.S.C. 154(b) by 302 days.

(21) Appl. No.: 12/686,872

(22) Filed: Jan. 13, 2010

(65) Prior Publication Data
US 2011/0170551 A1    Jul. 14, 2011

(51) Int. Cl.
*H04L 12/28* (2006.01)
(52) U.S. Cl. .................. 370/401; 361/735; 455/347
(58) Field of Classification Search .................. None
See application file for complete search history.

(56) References Cited

U.S. PATENT DOCUMENTS

| 3,572,865 A * | 3/1971 | Attardi .......................... 312/7.2 |
| 6,438,310 B1 * | 8/2002 | Lance et al. ................... 385/135 |
| 2005/0213295 A1 * | 9/2005 | Perez et al. .................... 361/683 |
| 2011/0170551 A1 * | 7/2011 | Lund ............................. 370/401 |

* cited by examiner

*Primary Examiner* — Robert Wilson
(74) *Attorney, Agent, or Firm* — Haynes and Boone, LLP

(57) ABSTRACT

A network processing device, such as a router, is implemented in a thin form factor chassis that encloses a primary printed circuit board. The router chassis has elongated openings on its top surface that permit access to connectors mounted on the printed circuit board. The printed circuit board includes all of the necessary electronic components that operate to receive, process, and transmit information over the network.

11 Claims, 6 Drawing Sheets

STACKABLE NETWORK PROCESSING DEVICE WITH TOP MOUNTED IO PORT CONNECTORS

BACKGROUND

1. Field of the Invention

The invention relates generally to the area of network router and switch mechanical design and specifically to a router or switch design where the IO ports are accessible from the top or bottom of the router or switch chassis.

2. Description of the Related Art

Routers are commercially available in thin form factors that can be mounted horizontally into a rack that has the capacity to hold two or more routers mounted one on top of the other. This stacked arrangement is a convenient means for fitting a large number of routers in the smallest possible floor area, or from another perspective, creates the smallest possible footprint for a large number of routers. Routers that are employed for such stacked arrangements typically exhibit a relatively small height dimension or are relatively thin. The standard form factors used for such stackable routers include ½ RU, 1RU, 2RU and 3RU form factors, where a 1U form factor represents a router chassis that has a physical dimension of 1.7 inches high, 17.32 inches wide and 16.73 inches deep.

Routers or switches implemented in the ½ U to 3RU form factor typically include one or more printed circuit boards oriented in the plane of the router chassis side with the largest surface area, which in this case is the top or bottom of the router. All of the electronic components necessary to receive information from a network, process the information and to transmit the information back to the network are included on the printed circuit board. These electronic components are connected via signal lines to IO port connectors that are conveniently positioned on the front or back of the router chassis and which are designed to accept various types of communication cables over which network traffic is transmitted. Network administrators can easily and conveniently configure the routers or switches by connecting the network cables to the IO port connectors located on the front or back of the router chassis. Unfortunately, positioning the IO port connectors on the front of a router with such a thin form factor limits the number of IO port connectors that can be positioned on the front of the router. One solution to the IO port density problem is to position a high density IO port connector on the front of the router and use a cable to connect the IO port on the connector to a patch panel or break out box to break out the ports on the high density connector. Although such an arrangement does increase the IO port connector density on the router, it does so at the expense of adding additional cabling, an additional device (breakout box/patch panel) and additional cost.

INVENTION SUMMARY

A network processing device in one embodiment is comprised of a thin form factor device chassis that encloses a printer circuit board to which is attached a plurality of electronic components for performing data processing functionality and to which is attached a plurality of IO port connectors. The IO port connectors are aligned with openings in the top or bottom of the device chassis and accessible from the top or bottom of the chassis.

DETAILED DESCRIPTION

A network processing device, such as a router or a switch, receives packets at multiple input ports, performs certain processes to manipulate the packet contents, and then transmits the modified packets out through one or more specified output ports. The data packets are finite-length units of data each containing a data payload and one or more headers. During a data packet's journey, network processing devices may route, switch, and/or modify the data packets.

Figure 1:
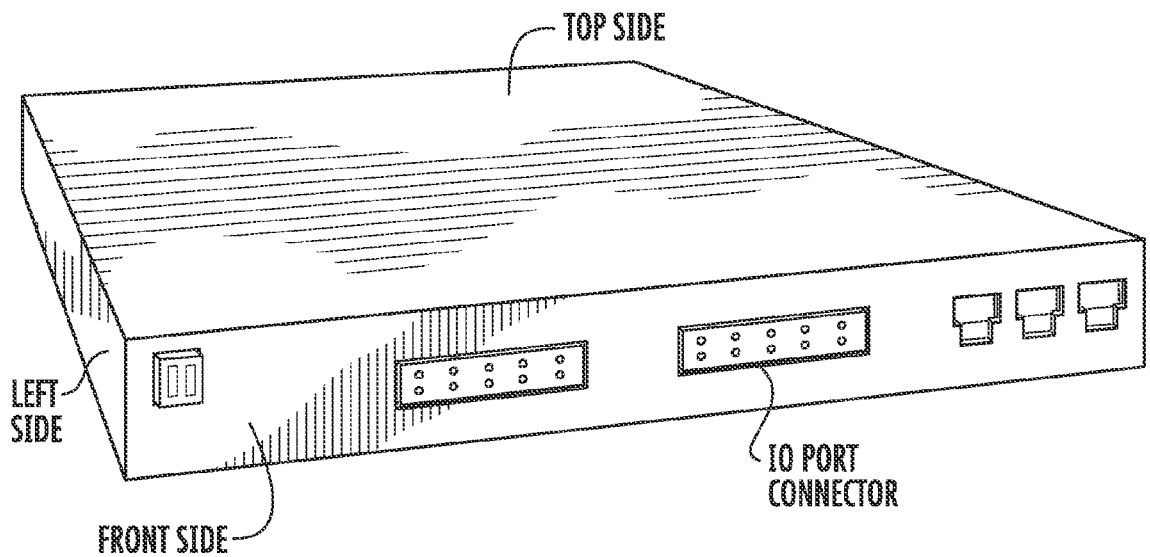
FIG. 1 illustrates a prior art switch with IO port connectors positioned on the front of the switch chassis.

FIG. 1 illustrates a prior art network processing device 10. The network processing device may operate as a network switch, a network router, and/or another device that is operable to control and manage data packets, forward data packets, and/or manipulate or modify data packets or a stream of data. Device 10 is operable to switch and route data packets, as well as to edit the packets as necessary and comprises a single or primary printed circuit board (PCB not shown), which in this case can be a line card, that provides the physical IO port connections and functionality for sending and/or receiving data packets/frames to/from other packet network devices. Device 10 comprises top and a bottom sides and front, rear and left and right sides. Provided that the device 10 chassis size conforms to a ½ RU to 3RU form factor, the height of the chassis is substantially smaller than either the width or the depth of the chassis. The IO port connectors positioned on the front of the device 10 can be connected to electronic components on the PCB that operate to support high-speed data transmission such as Gigabit Ethernet traffic or some other class of high-speed communications traffic. Such a network processing device design is limited with respect to the number of physical IO port connectors that can be positioned on the front of the device due to the relatively small surface area associated with the front side of the device. This limitation to the number of IO port connectors that can be positioned on the front side of the device 10 results in the need to include a relatively large number of network processing devices in a rack mounted arrangement in order to achieve a desired throughput.

Figure 2:
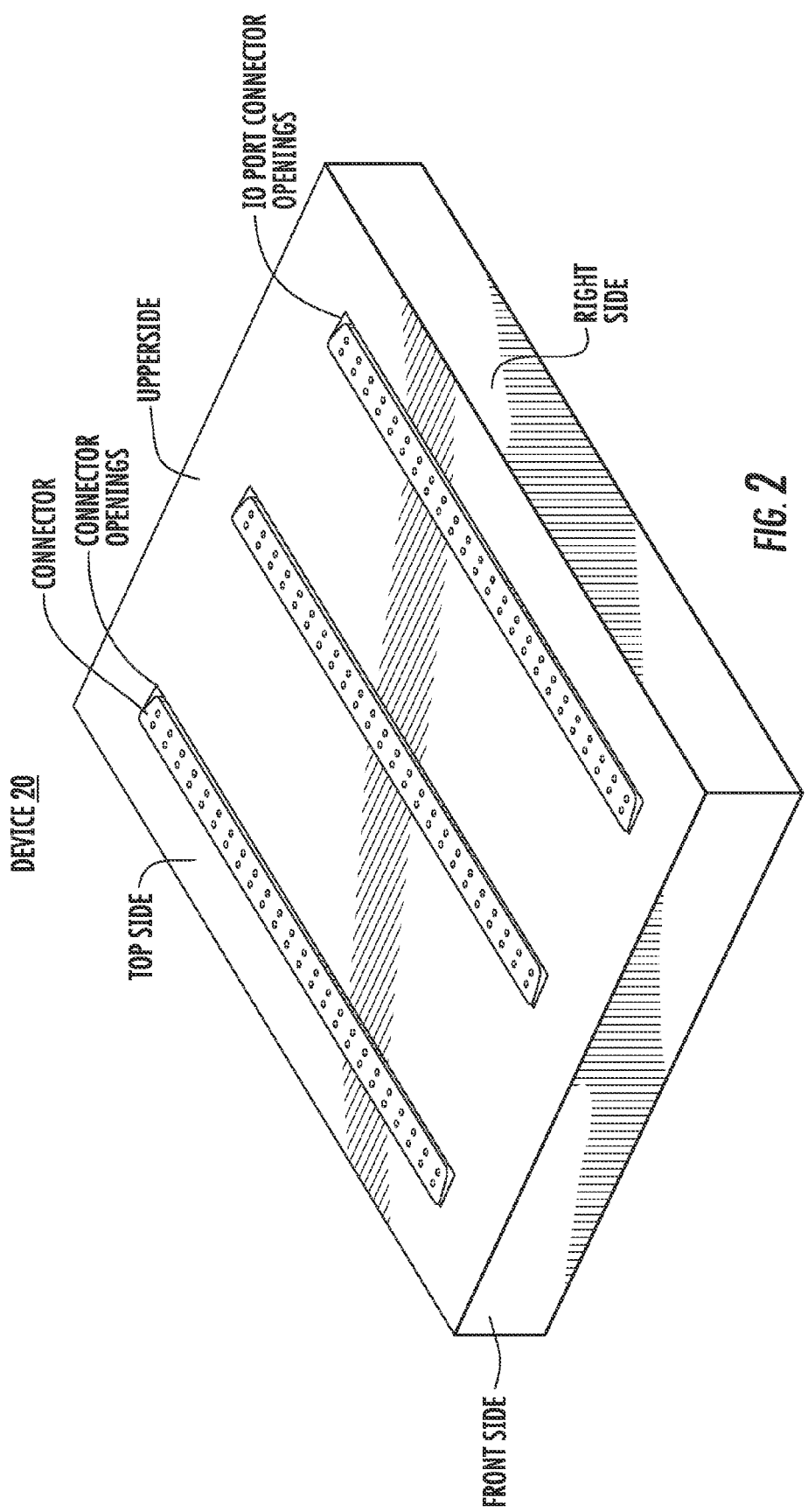
FIG. 2 illustrates a thin form factor switch with IO port connectors positioned on the top side of the switch chassis.

FIG. 2 illustrates a network processing device chassis 20 with three openings on the top or upper side which are aligned with one or more IO port connectors that are attached to a PCB enclosed by the device chassis. Device 20 can perform substantially the same functionality as device 10 described with reference to FIG. 1 and can be designed to conform to the same range of form factors as described with reference to device 10 and so will not be described again here. However, as opposed to positioning the IO port connectors on the front side, as was described with reference to the device in FIG. 1, device 20 includes openings in the top of the chassis to permit access to IO port connectors that are attached to the PCB. Positioning the IO port connector openings on the top of the device 20 chassis, it is possible to include many more IO port connectors and therefore IO ports per device than is otherwise possible. FIG. 2 illustrates an embodiment where three 24×2 RJ45 connectors are attached to the PCB and protrude through the openings in the device 20 chassis. The top of the IO port connectors can be flush with the top side surface of the device chassis, they can be below the top side surface of the chassis or they are protrude through the opening in the top side surface of the chassis. One embodiment supports one hundred and forty four IO ports, but more or fewer IO ports can be supported depending upon the number and type of IO port connectors that are used.

Figure 3:
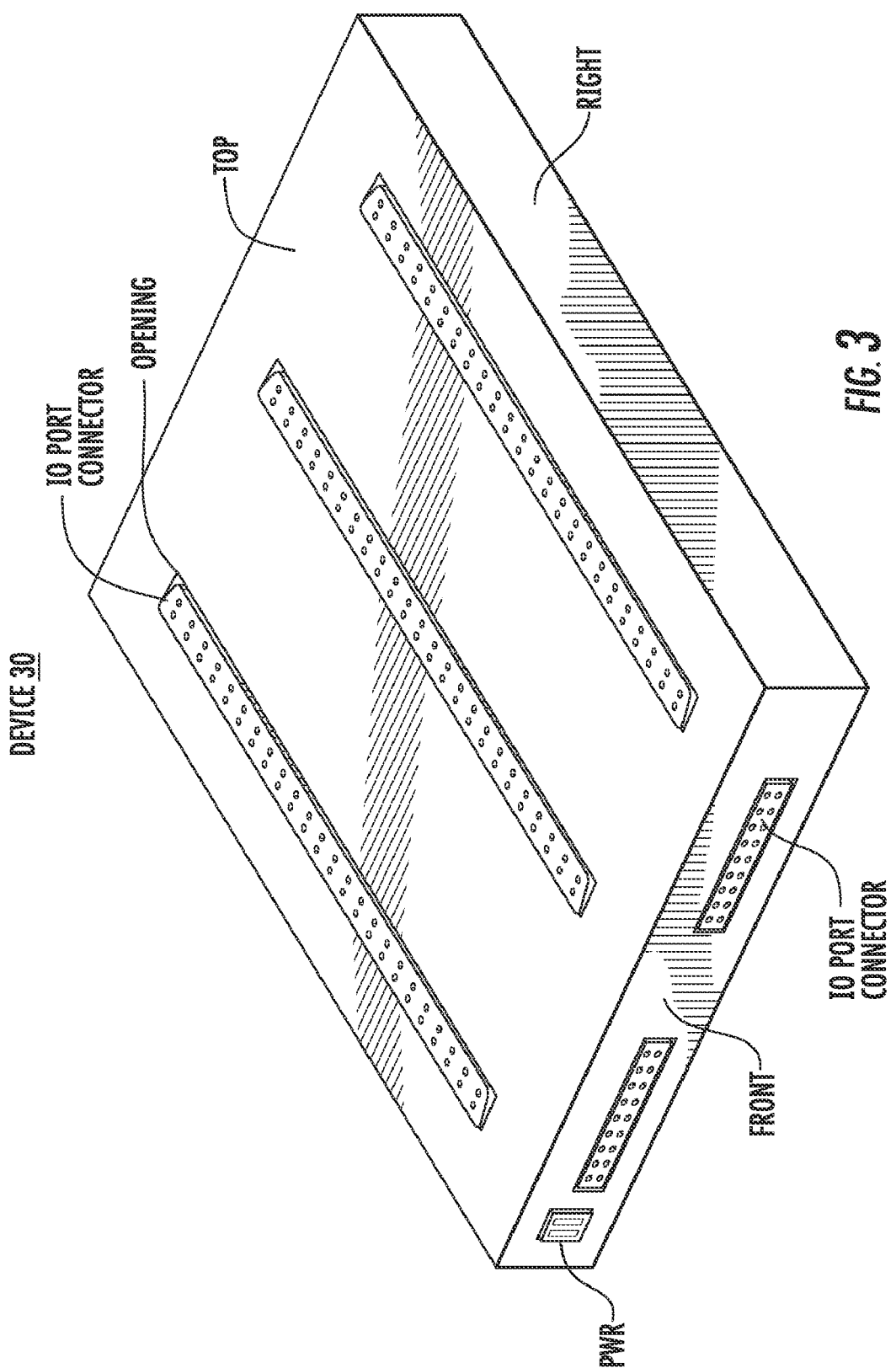
FIG. 3 illustrates a thin form factor switch with IO port connectors positioned on both the top and front sides of the switch chassis.

FIG. 3 illustrates a network processing device 30 that is substantially the same as the network processing device 20 described with reference to FIG. 2. Device 30 is comprised of a primary PCB with electronic components that provide support for the data switching functionality, described earlier with reference to FIG. 1, and is comprised of IO port connectors attached to the electronic components via signal lines on the PCB. Device 30 is shown as including the same number and types of IO port connectors on its top side as device 20, but in addition to these three connectors, device 30 includes IO port connectors on the front side of the chassis as shown on device 10 and as described with reference to FIG. 1. This embodiment provides greater IO port density per network processing device than either of the devices 10 or 20.

Figure 4:
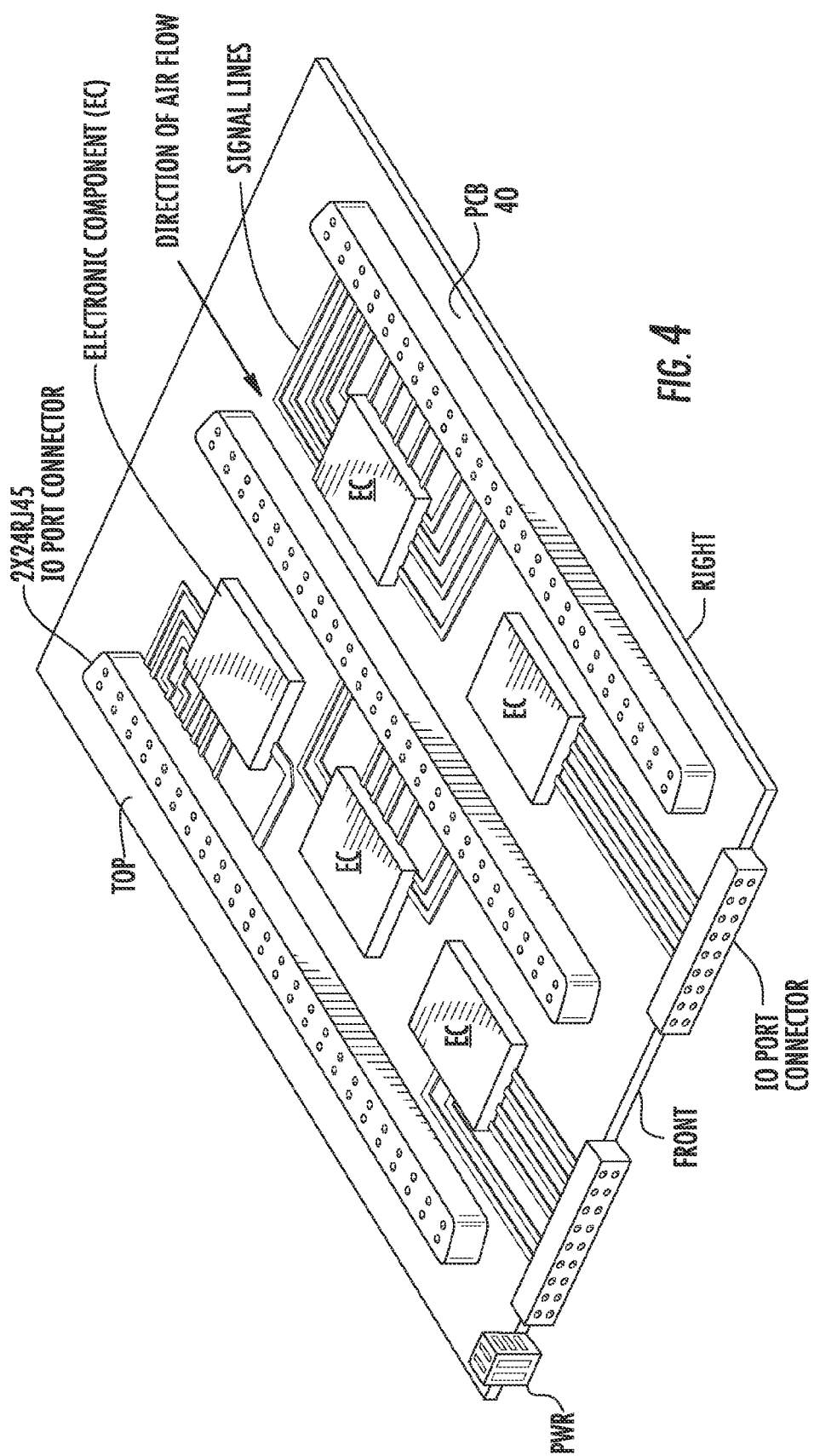
FIG. 4 illustrates a printed circuit board with electronic components connected to IO port connectors positioned to be accessible from both the top and front of the switch chassis.

FIG. 4 shows a primary PCB 40, which is substantially similar to the PCB described with reference to the embodiment of FIG. 3. PCB 40 is comprised of three IO port connectors that are positioned on the PCB so that they can be accessed from the top side and front side of the chassis that encloses the PCB. It should be understood, that other embodiments are possible in which the PCB is comprised of IO port connectors attached to both of its sides and in which the device chassis includes openings on the top and on the bottom that are aligned with the IO port connectors. Such an arrangement increases the IO port density per device even further. PCB 40 includes a plurality of electronic components (EC) which operate to support high-speed data transmission such as Gigabit Ethernet traffic or some other class of high-speed communications traffic. A single electronic component can provide all of the necessary network switching functionality or a plurality of components comprising a chip set can provide the network switching functionality. Each of the electronic components is connected via signal lines to at least one of the IO port connectors, and cables can be attached to the IO port connectors to carry information to and away from the IO ports. Any type of appropriate IO port connector can be employed to provide cable connections to the top and to the front of the device 40 chassis, but in this case three 2×24 RJ45 connectors are shown which provide cable connections to the top of the PCB. All of the IO port connectors attached to the PCB and substantially all of the electronic components are oriented in the direction of an air flow generated by one or more fans that can be positioned on the rear side of the network processing device 30 chassis. This air flow cools the electrical components attached to the PCB and the orientation of the connectors and components is critical to the efficiency with which the air flow is able to cool the components that generate heat. While the preferred embodiment is described in the context of a single, primary PCB, more than one printed circuit boards can be included. Smaller, daughter boards can be connected to the primary PCB for instance or there can be more than one primary PCB included in the router chassis.

Figure 5:
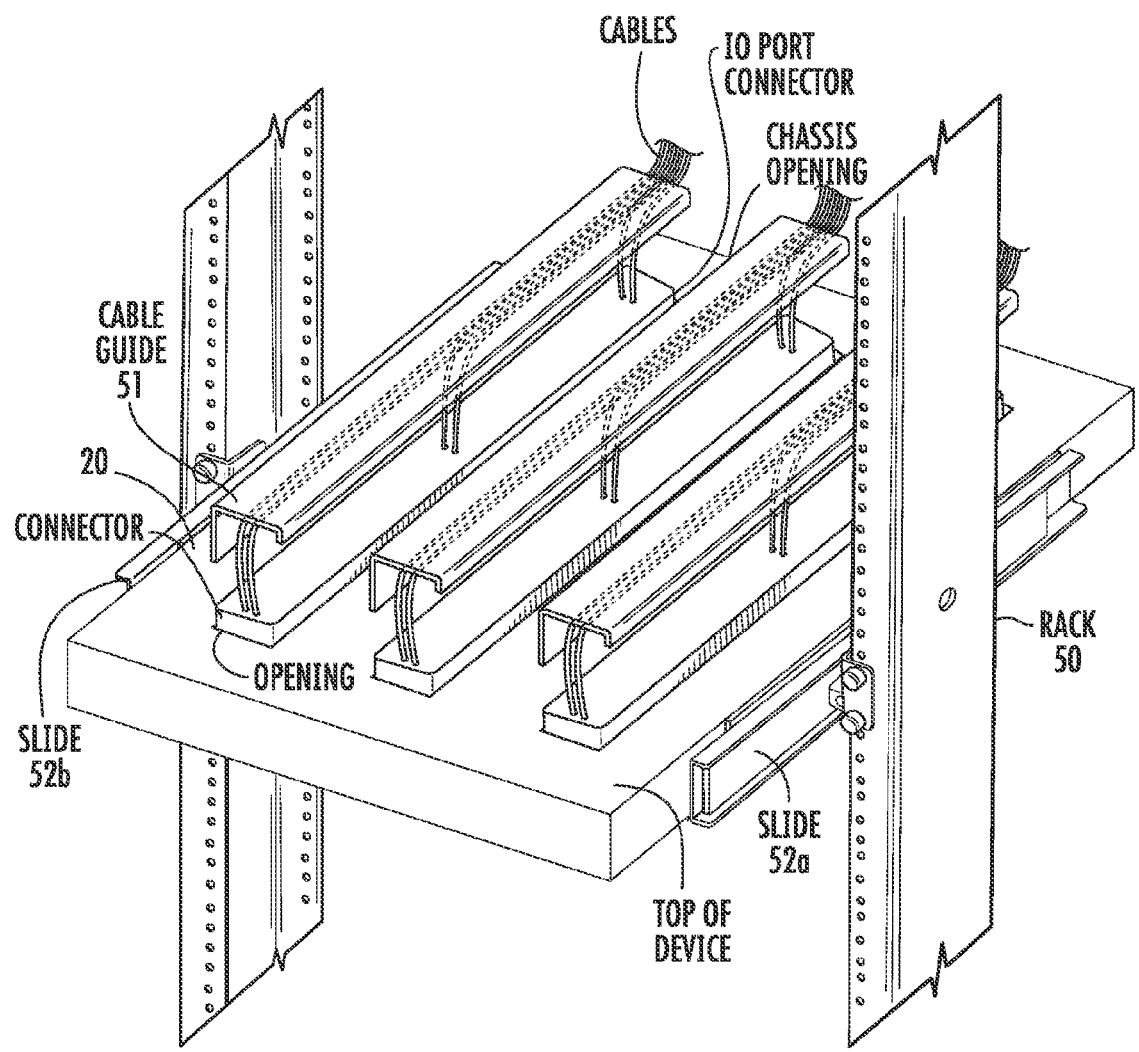
FIG. 5 illustrates network processing device with IO port connectors positioned on the top mounted in a rack with draw slides.

FIG. 5 illustrates a network processing device, such as the device 20 described with reference to FIG. 2, which is slidably mounted with a set of draw slides 52a and 52b to a vertical rack 50. Mounting the device 20 to the rack with draw slides permits the device to be pulled out if it needs to be serviced or replaced or if the cables attached to the IO port connectors need to be attached, replaced or repositioned. Optional cable guides 51a, 51b and 51c are shown attached to the top of the device chassis proximate to or over top of and oriented with each of the IO port connectors. The cable guide serves to retain the cables so that they lie closely to the top of the device chassis and so that the cables are not damaged if another device, mounted in the rack 50 directly above the device 20, is pulled out for servicing.

Figure 6:
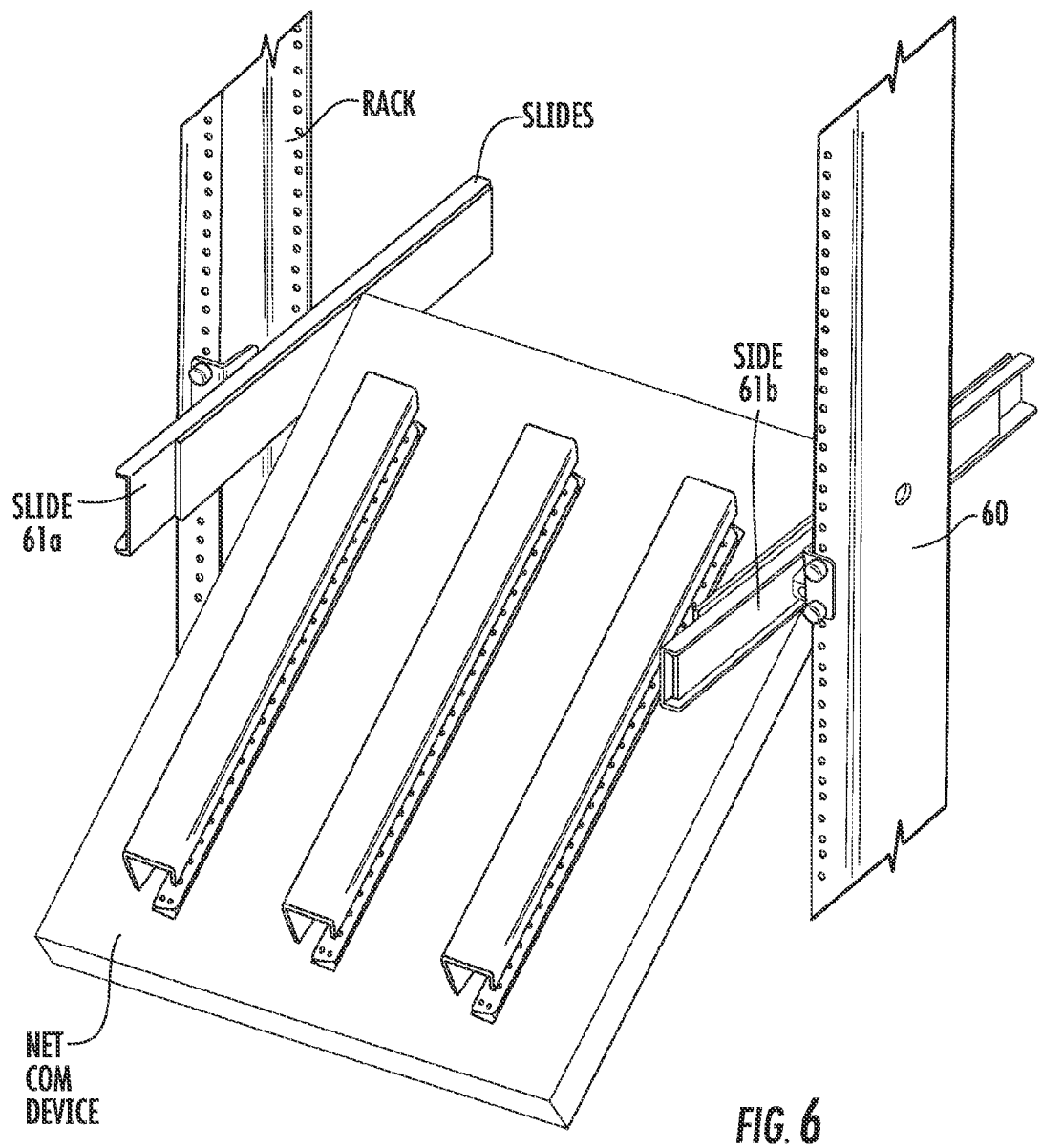
FIG. 6 illustrates the network processing device of FIG. 5 mounted in a rack with a tiltable draw slide.

FIG. 6 illustrates a network processing device, such as the device 20 described with reference to FIG. 2, which is mounted to a rack 60 using a set of tiltable draw slides 61a and 61b. The advantage in mounting the device to the rack using a tiltable draw slide is that the device can be pulled out and tilted to allow more convenient access to the cables attached to the IO port connectors accessible on the top of the device chassis.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A network processing device comprising:
    a chassis having a thin form factor and a substantially rectangular prism shape, the chassis including:
        a pair of side surfaces that are located opposite the chassis from each other and that are each configured to engage a different portion of a rack;
        a front surface that extends between the pair of sides surfaces;
        a rear surface that extends between the pair of side surfaces and is located opposite the chassis from the front surface; and
        a connector access surface that extends between the front surface, the rear surface, and the pair of sides surfaces, wherein connector access surface include a larger surface area than any of the front surface, the rear surface, and the pair of sides surfaces;
    at least one first opening defined by the connector access surface;
    a printed circuit board housed in the chassis;
    a first IO port connector extending from the printed circuit board and aligned with the at least one first opening in the connector access surface such that each of a plurality of IO ports on the first IO port connector are accessible through the at least one first opening; and
    at least one electronic component electrically connected to the first IO port connector and operable to support high-speed data processing.

2. The network processing device of claim 1 further comprising:
    at least one second opening defined by the front surface; and a second IO port connector extending from the printed circuit board and aligned with the at least one second opening in the front surface such that each of a plurality of IO ports on the second IO port connector are accessible through the at least one second opening, wherein the at least one electronic component is electrically connected to the second IO port connector.

3. The network processing device of claim 1 further comprising:
a second IO port connector extending from the printed circuit board and aligned with the at least one first opening in the connector access surface such that each of a plurality of IO ports on the second IO port connector are accessible through the at least one first opening, wherein the at least one electronic component is electrically connected to the second IO port connector.

4. The network processing device of claim 1 further comprising:
a cable guide that is operable to be coupled to the chassis proximate to the first IO port connector.

5. The network processing device of claim 1 wherein the pair of side surfaces on the chassis are each configured to engage a different portion of a rack such that the chassis is slidably mounted to the rack.

6. The network processing device of claim 5 wherein the pair of side surfaces on the chassis are each configured to engage a different portion of a rack such that the chassis is tiltable relative to the rack.

7. A network processing device comprising:
a rack including a plurality of chassis engaging members;
at least one chassis having a substantially rectangular prism shape located in the rack, each at least one chassis including:
a pair of side surfaces that are located opposite the chassis from each other and that each engage a respective one of the plurality of chassis engaging members;
a front surface that extends between the pair of sides surfaces; and
a connector access surface that extends between the front surface and the pair of sides surfaces, wherein the connector access surface include a larger surface area than any of the front surface and the pair of sides surfaces;
at least one first opening defined by the connector access surface;
a printed circuit board housed in each of the at least one chassis;
a plurality of first IO port connectors electrically connected to the printed circuit board housed in each of the at least one chassis, the plurality of first IO port connectors aligned with the at least one first opening in the connector access surface of each of the at least one chassis; and
a plurality of electronic components electrically connected to the plurality of first IO port connectors in each of the at least one chassis, the plurality of electronic components operating to support high-speed data processing.

8. The network processing device of claim 7 further comprising:
a cable guide proximate to at least one of the plurality of first IO port connectors on each of the at least one chassis.

9. The network processing device of claim 7 further comprising:
at least one second opening defined by the front surface of each of the at least one chassis; and
a second IO port connector connected to the printed circuit board housed in each of the at least one chassis, the second IO port connector aligned with the at least one second opening in the front surface such that each of a plurality of IO ports on the second IO port connector are accessible through the at least one second opening, wherein the plurality of electronic components in each of the at least one chassis are electrically connected to the second IO port connector.

10. The network processing device of claim 7 wherein the chassis engaging members allow each of the at least one chassis to slide relative to the rack.

11. The network processing device of claim 10 wherein the chassis engaging members allow each of the at least one chassis to tilt relative to the rack.

* * * * *